United States Patent [19]

Stappaerts

[11] 4,306,195
[45] Dec. 15, 1981

[54] PULSE COMPRESSOR WITH SATURATION-MATCHED FOCUSING GEOMETRY

[75] Inventor: Eddy A. Stappaerts, Redondo Beach, Calif.

[73] Assignee: Northrop Corporation, Los Angeles, Calif.

[21] Appl. No.: 69,940

[22] Filed: Aug. 27, 1979

[51] Int. Cl.³ .............................................. H03F 7/00
[52] U.S. Cl. ..................................... 330/4.5; 307/426
[58] Field of Search .................. 307/426; 330/4.5, 4.6

[56] References Cited

U.S. PATENT DOCUMENTS 3,515,897 6/1970 Culver .................................. 330/4.5

*Primary Examiner*—David C. Nelms
*Assistant Examiner*—Darwin R. Hostetter
*Attorney, Agent, or Firm*—Edward A. Sokolski

[57] ABSTRACT

A backward-wave Raman amplifier or pulse compressor for compressing laser pulses. A laser pulse, or pump beam, of relatively long duration enters one end of the compressor. A short, initiating Stokes-Raman pulse enters the other end of the compressor and absorbs energy from the pump beam as the Stokes-Raman pulse traverses the compressor. The cross-sectional area of the Stokes-Raman pulse within the compressor increases linearly with distance traversed through the compressor so that the energy density within the pulse remains substantially constant as the pulse traverses the compressor and receives energy from the pump beam which traverses the compressor in the opposite direction. The cross section of the pump beam also varies linearly with distance within the compressor so as to coincide substantially with the cross section of the Stokes-Raman pulse and thus achieve efficient compression.

2 Claims, 2 Drawing Figures

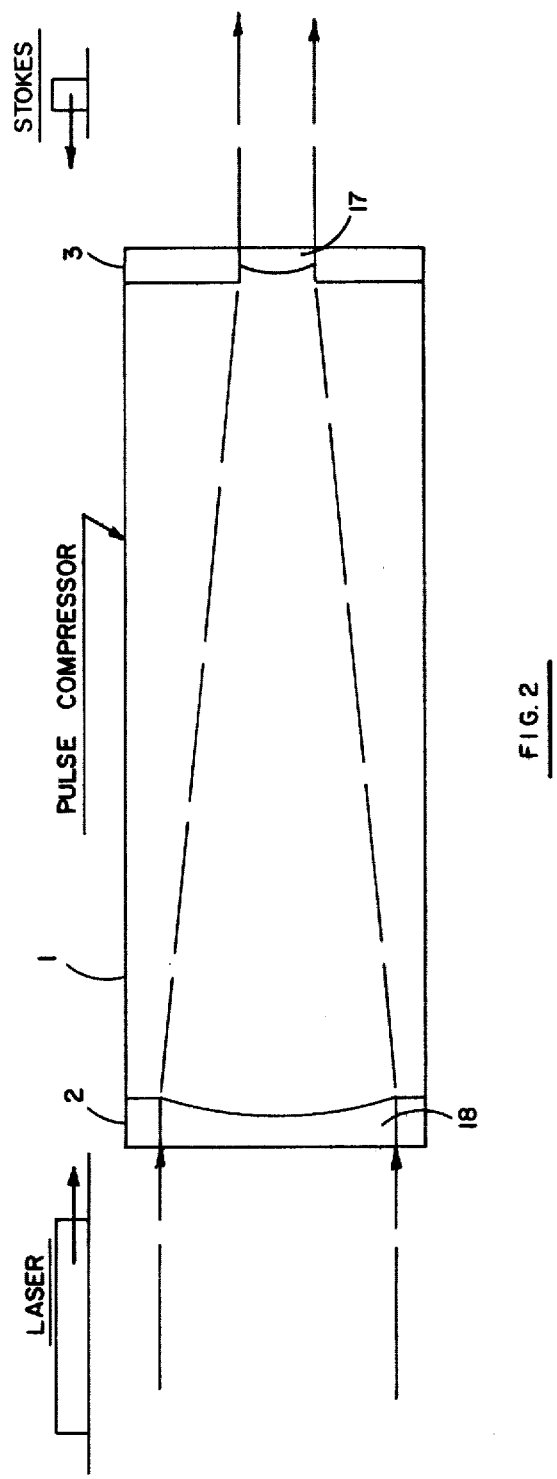

PULSE COMPRESSOR WITH SATURATION-MATCHED FOCUSING GEOMETRY

BACKGROUND OF THE INVENTION

1. Field of the Invention

This invention pertains to lasers. More particularly, it pertains to methods and devices for compressing the length of electromagnetic pulses generated by lasers.

2. Description of the Prior Art

The short, ultraviolet wave-length and the high efficiency of the rare gase halide excimer lasers make them very promising candidates as drivers of a thermonuclear fusion reactor (see e.g. *Physics Today*, May 1978, page 39). However, the pulse length of these lasers, which is on the order of 100 nanoseconds, is too long for this application. For this reason, methods and devices are being developed to compress the pulses produced by these lasers to pulse lengths on the order of 1 to 10 nanoseconds. One device being developed utilizes backward Raman scattering.

U.S. Pat. No. 3,515,897, titled "Stimulated Raman Parametric Amplifier", describes in some detail the manner in which the backward-wave, Raman amplifier operates to transform the energy contained in a relatively lengthy pulse of pump power (the primary beam) into a relatively short burst of electromagnetic radiation at the Stokes-Raman frequency (a frequency displaced from the frequency of the pump beam by the Raman shift of the scattering medium). The backward wave Raman amplifiers in the prior art utilize beams of pump power and beams of Stokes-Raman pulses in the scattering medium which have a uniform cross-sectional area and shape throughout the scattering medium. A few of the prior art devices, e.g. U.S. Pat. No. 3,515,897, in some instances provide for focusing of the pump beam within the scattering media in order to initiate the Stokes-Raman pulse at the focal point. These focusing arrangements, however, are not oriented so as to be coordinated with the build-up of the energy density in the Stokes-Raman pulse as it progresses through the amplifier.

SUMMARY OF THE INVENTION

The present invention utilizes optical means to alter the pump beam and the Stokes-Raman beam geometry within the amplifier so as to maintain substantially constant the energy density in the Stokes-Raman pulse as it traverses the scattering medium.

Once a critical energy density in the Stokes-Raman pulse has been reached, nearly all of the pump beam energy is transferred into the Stokes-Raman pulse as the pulse progresses through the amplifier. In devices where the cross-sectional area of the pulse remains constant as it traverses the amplifier, the energy density increases above the critical level required for efficient transfer of energy from the pump pulse and results in a degradation in efficiency due to non-linear processes, such as multi-photon ionization which increase at the higher pulse energy densities.

In a saturated Raman amplifier, the energy contained in the Stokes-Raman pulse increases substantially linearly as the pulse traverses the amplifier. The geometry of the beams in this invention is arranged such that the cross-sectional area of the Stokes-Raman pulse also increases substantially linearly as the pulse traverses the amplifier. As a consequence, in this invention, the energy density in the Stokes-Raman pulse remains substantially constant at the optimum level for efficient energy transfer from the pump pulse and thus does not exhibit degradation in the transformation process due to the non-linear side effects associated with higher energy densities.

In this invention, the cross-sectional area of the pump pulse is caused by optical means to coincide substantially with the linearly increasing cross-sectional area of the Stokes-Raman pulse so as to achieve efficient operation throughout the amplifier.

BRIEF DESCRIPTION OF THE DRAWINGS

FIG. 2 illustrates the saturation-matched focusing geometry of the pulse compressor.

BRIEF DESCRIPTION OF AN OPERABLE EMBODIMENT OF THE INVENTION

Figure 1:
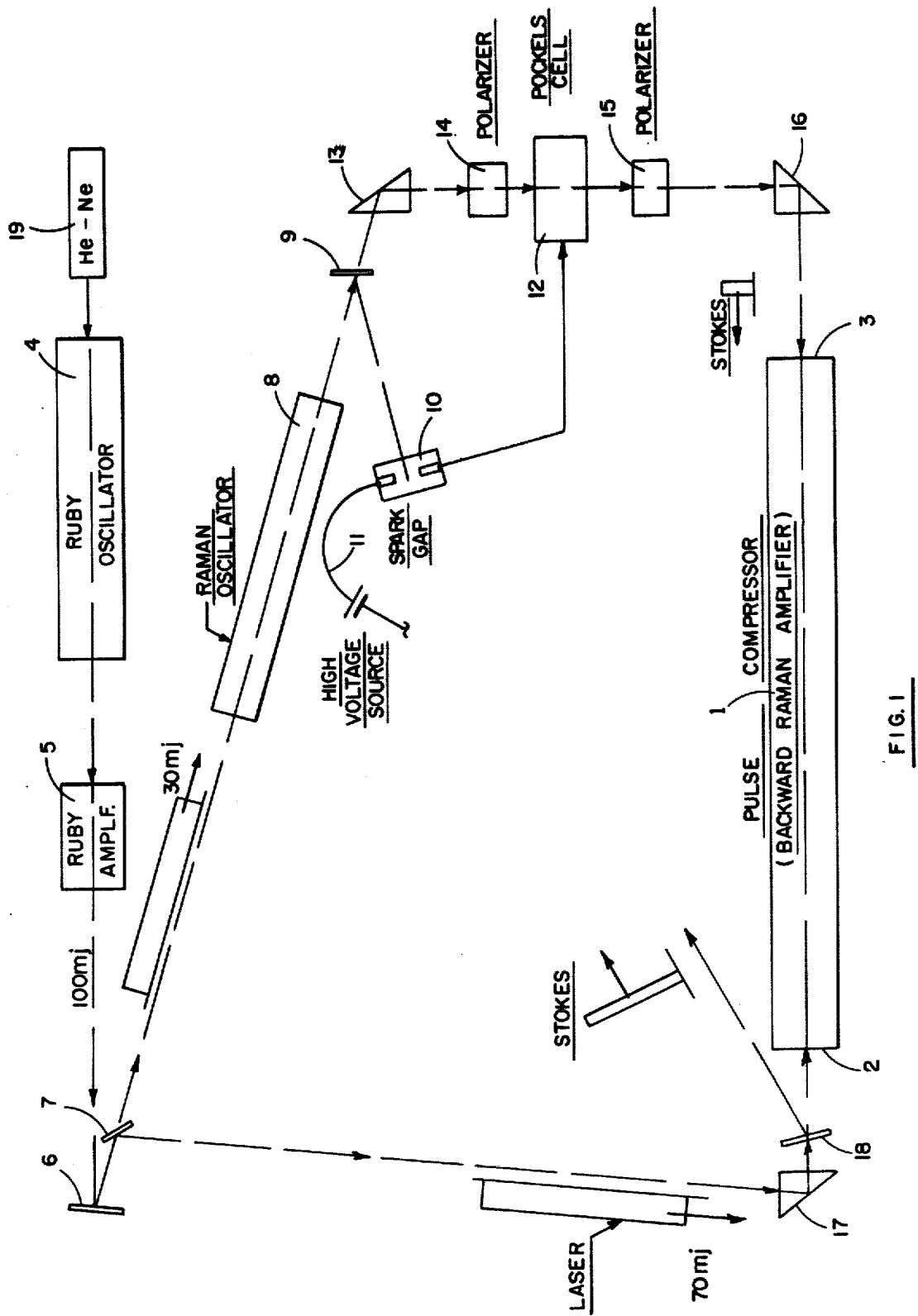
FIG. 1 is a schematic diagram of an experimental set-up for testing and operating the invention.

FIG. 1 shows the invention, the pulse compressor 1 and the related equipment that is used for the testing and operating of the invention. The backward Raman pulse compressor, referred to here as pulse compressor 1, is a backward Raman amplifier which utilizes stimulated backward Raman scattering in a gaseous molecular medium such as $CH_4$ to convert a beam of laser energy (the pump beam) entering from end 2 into a compressed Stokes-Raman pulse which enters end 3. As described in U.S. Pat. No. 3,515,897, the conversion of pump energy into the Stokes-Raman pulse causes the energy in the Stokes-Raman pulse to increase as the pulse traverses from end 3 to end 2 of the amplifier. The embodiment described here uses molecular methane at a pressure of several atmospheres.

One means of generating the laser pump beam and the initial Stokes-Raman pulse is illustrated in FIG. 1. Ruby oscillator 4, in conjunction with ruby amplifier 5, generates an electromagnetic pulse of approximately 100 millijoules of energy and 25–30 nanoseconds in duration. The pulse is reflected by mirror 6 and split into two parts by partially reflective mirror 7. One part containing about 30 millijoules of energy enters Raman oscillator 8 where it is converted into a Stokes-Raman pulse containing approximately 10 millijoules of energy.

The unused energy at the ruby laser frequency which has not been converted to the Stokes-Raman pulse and which exits from Raman oscillator 8 is reflected by mirror 9 to the spark gap 10, which spark gap is energized by high voltage source 11. The pulse entering spark gap 10 triggers a spark which in turn causes the Pockels cell 12 to alter by 90° the orientation of the polarization of a short portion of the Stokes-Raman pulse which, in the mean time, has exited Raman oscillator 8, passed through mirror 9 (which is not reflective to the Stokes-Raman pulse frequency), been reflected by prism 13, passed through polarizer 14, and is incident on the Pockels cell 12 at the time that the spark causes the Pockels cell momentarily rotate the polarization of the energy passing through it by 90°. The Stokes-Raman pulse which exits the Pockels cell is incident upon a second polarizer 15, the polarization of which is oriented at 90° to that of polarizer 14. As a consequence, only that portion of the Stokes-Raman pulse which was rotated 90° in polarization by the Pockels cell passes through polarizer 15. Thus, the Pockels cell 12, and the polarizers 14 and 15, act in combination to transmit only a short portion of the Stokes-Raman pulse incident thereon, the transmitted pulse being approximately 1 nanosecond in length. The shorted pulse which, exits from polarizer 15, is reflected by prism 16 and enters end 3 of the pulse compressor 1 as the initiating Stokes-Raman pulse.

Approximately 70 percent or 70 millijoules of the laser energy incident on mirror 7 is reflected from mirror 7. The reflected energy then is reflected from prism 17 through mirror 18, which is transparent to the ruby laser frequency but reflective to the Stokes-Raman frequency, and then enters end 2 of pulse compressor 1. The helium-neon laser 19 illustrated in FIG. 2 is used for alignment purposes only.

As described in U.S. Pat. No. 3,515,897, the Stokes-Raman pulse, after entering end 3, travels towards end 2 of the pulse compressor 1, receiving energy from the laser pump pulse which has entered end 2. The energy density of the Stokes-Raman pulse entering end 3 is selected to be large enough initially to saturate the backward Raman scattering mechanism. As a consequence, nearly all the pump energy entering from end 2 is transformed into the Stokes-Raman pulse as it travels through the pulse compressor. Typically, pump pulse energy densities of the order of 1 to 10 joules per square centimeter are required for the operation of this invention.

Referring now to FIG. 2 which illustrates the saturation-matched focusing geometry of this invention. Because the pulse compressor is operated so that the backward Raman scattering transformation mechanism is saturated, the energy in the Stokes-Raman pulse increases substantially linearly as the Stokes-Raman pulse progresses from end 3 towards end 2 of the pulse compressor 1. Shortly before entering end 3 of the pulse compressor, the Stokes-Raman pulse beam passes through cylindrical diverging lens 17 which causes the Stokes-Raman pulse beam to diverge in one dimension as it passes from end 3 to end 2 of the pulse compressor. The boundaries of the Stokes-Raman pulse are indicated in FIG. 2 by dotted lines. Prior to entering end 2 of pulse compressor 1, the laser or pump beam passes through converging cylindrical lens 18 which causes the cross section of the pump beam to converge linearly in one of two dimensions as it traverses from end 2 to end 3 of pulse compressor 1. Typically, the cross section of the pump beam as it enters the pulse compressor will be circular in shape and as a consequence the pump beam will become elliptical in shape at end 3. The shape of the cross section of the Stokes-Raman pulse that enters end 3 has been previously adjusted to an elliptical shape, either by means of a cylindrical reducer contained in polarizer 14 (shown in FIG. 1) or by means of an elliptically shaped screen inserted in the path of the Stokes-Raman pulse prior to its entering end 3. As indicated in FIG. 2, the radii of curvature of the converging lens 18 and of the diverging lens 17 are selected such that the cross-sectional areas of the pulse beam and of the Stokes-Raman beam are substantially equal at each point throughout the length of the pulse compressor. The dimensions and powers of the lenses are selected such that the cross-sectional area of the Stokes-Raman pulse at each point within the compressor is proportional more or less to the energy contained in the Stokes-Raman pulse at that point in the compressor and thus the energy density in the pulse remains substantially constant as the pulse traverses the pulse compressor. In this way, the energy density of the Stokes-Raman pulse is maintained at or near the saturaton level of the backward Raman amplifier (pulse compressor 1) and the undesirable non-linear side effects of higher energy densities are avoided. After receiving the energy from the pump pulse, the Stokes-Raman pulse exits from end 2 of the pulse compressor and is reflected by mirror 18 to produce the short pulse that is output from the invention.

Other optical means could be used in place of the lenses to obtain the substantially linear change in cross-sectional area of the beams within the pulse compressor. For instance, cylindrical diverging and converging mirrors could be used for this purpose. It is also apparent that the lens or mirrors can be located either internal or external to the pulse compressor 1.

One further desirable side effect of the saturation-matched focusing geometry is that the energy density of the Stokes-Raman pulse exiting from end 2 is less than otherwise is exhibited by a conventional pulse compressor with uniform cross section. As a consequence, damage to the optics and to the exit window is less likely in this invention.

I claim:

1. In a backward Raman pulse compressor for transferring pump energy traveling in one direction through the compressor into energy contained in a Stokes-Raman pulse traveling in the opposite direction through the compressor, said backward Raman compressor having a first end for receiving pump energy and having a second end for receiving an initiating Stokes-Raman pulse:
   (a) a first cylindrical lens located near the first end of the compressor and selected and oriented in the path of the pump energy entering the first end so as to cause the cross-sectional area occupied by the pump energy to decrease substantially linearly with distance traveled within the compressor from the first end toward the second end,
   (b) a second cylindrical lens located near the second end of the compressor and selected and oriented in the path of the initiating Stokes-Raman pulse so as to cause the cross-sectional area occupied by the initiating Stokes-Raman pulse entering the second end of the compressor to increase substantially linearly with distance traveled within the compressor from the second end toward the first end,
   (c) said first and second cylindrical lens and the paths of the pump energy and of the initiating Stokes-Raman pulse being oriented within the compressor so that the cross sections of the pump energy and of the Stokes-Raman pulse substantially coincide throughout substantially all of the length of the compressor.

2. In a backward Raman pulse compressor for transferring pump energy traveling in one direction through the compressor into energy contained in a Stokes-Raman pulse traveling in the opposite direction through the compressor, said backward Raman compressor having a first end for receiving pump energy and a second end for receiving an initiating Stokes-Raman pulse:
   (a) first optical means for causing the cross-sectional area of the pump energy entering the first end of the compressor to decrease substantially linearly with distance traveled within the compressor from the first end towards the second end,
   (b) second optical means for causing the cross-sectional area occupied by the initiating Stokes-Raman pulse entering the second end of the compressor to increase substantially linearly with distance traveled within the compressor from the second end towards the first end,
(c) said first and second optical means causing the cross sections of the pump energy and of the initiating Stokes-Raman pulse to substantially coincide throughout substantially all the length of the compressor.

* * * * *